United States Patent [19]

Tsuneyoshi

[11] Patent Number: 5,758,035

[45] Date of Patent: May 26, 1998

[54] GRAPHIC PLOTTING APPARATUS PLOTTING DIAGRAM REPRESENTED BY FUNCTION AND GRAPHIC PLOTTING METHOD THEREOF

[75] Inventor: Katsumasa Tsuneyoshi, Osaka, Japan

[73] Assignee: Sharp Kabushiki Kaisha, Osaka, Japan

[21] Appl. No.: 158,408

[22] Filed: Nov. 29, 1993

[30] Foreign Application Priority Data

Nov. 30, 1992 [JP] Japan ................................ 4-320432

[51] Int. Cl.$^6$ ............................................ G06K 15/00
[52] U.S. Cl. .................... 395/103; 395/101; 395/140
[58] Field of Search ........................ 395/117, 101, 395/103, 110, 111, 112, 104, 105, 106, 109, 140; 364/700

[56] References Cited

U.S. PATENT DOCUMENTS

| 3,637,997 | 1/1972 | Petersen | 235/92 N |
| 4,941,193 | 7/1990 | Barnsley et al. | 382/56 |
| 4,945,498 | 7/1990 | Mitamura | 364/521 |
| 5,073,963 | 12/1991 | Sammons et al. | 382/30 |
| 5,095,450 | 3/1992 | Shakra et al. | 395/114 |
| 5,159,361 | 10/1992 | Cambier et al. | 351/212 |

FOREIGN PATENT DOCUMENTS

| 3-223997 | 10/1991 | Japan | G06F 15/72 |
| 4-112278 | 4/1992 | Japan | G06F 15/72 |

OTHER PUBLICATIONS

*Origin* ™ *Technical Graphics and Data Analysis in Windows Reference Manual (U2)*, Microbal Software, 1992.
*Advanced Chartist*, Pardo Corporation, Evanston, IL. 1987 Chapters 2 and 4.

*Primary Examiner*—Raymond J. Bayerl
*Assistant Examiner*—Steven P. Sax

[57] ABSTRACT

A specifying unit specifies a plot range and the plot spacing of a diagram represented by a desired function input by an input unit; a correlating unit correlates the specified plot range and plot spacing of the diagram with a position on a display unit; and a plotting unit plots the diagram with arbitrarily spacing on the display unit.

8 Claims, 9 Drawing Sheets

5,758,035

1

GRAPHIC PLOTTING APPARATUS PLOTTING DIAGRAM REPRESENTED BY FUNCTION AND GRAPHIC PLOTTING METHOD THEREOF

BACKGROUND OF THE INVENTION

1. Field of the Invention

The present invention relates to a graphic plotting apparatus and the plotting method thereof, and particularly to a graphic plotting apparatus plotting a diagram expressed by a prescribed function and the graphic plotting method thereof.

2. Description of the Background Art

A graphic plotting apparatus has been made compact and more functional due to the development of semiconductor technology, and an improved graphic plotting apparatus, such as a scientific electronic calculator, having a calculation function of high performance and a display function capable of displaying various diagrams has been provided.

Description will hereinafter be made on a conventional graphic plotting apparatus with reference to the drawings.

FIG. 6 shows the appearance of a conventional graphic plotting apparatus. On the center part and the lower part of the apparatus, an input portion 22 including a graph plotting key K11, a variable input key K12, a function key K13, a numeral key K14, a coordinate range input key K15 and the like is provided for inputting expressions, such as four arithmetical operations, a functional calculation, a statistical calculation and the like, and inputting a program in combination with these calculations. On the upper part of the apparatus, a display portion 21, such as a liquid crystal display, is provided for displaying an input expression, an input program, and a calculation result and a resultant diagram and the like. The apparatus further includes a CPU (Central Processing Unit), an ROM (Read Only Memory), an RAM (Random Access Memory) and the like therein (not shown). The conventional apparatus is thus structured, so that a calculation result of a desired expression can be displayed as numerals, or displayed as a diagram.

FIG. 7 is a functional block diagram of the main part of the conventional graphic plotting apparatus. As shown in FIG. 7, the conventional graphic plotting apparatus includes an input unit 21, a constant value adding unit 22, a coordinate position calculating unit 23, a plotting unit 24, and a display unit 25.

First, a desired functional expression and a plot range for a diagram to be represented by the functional expression are input through input unit 21. In order to obtain values each corresponding to a lateral position of a pixel in the plot range for the diagram on a display screen of display unit 25, constant value adding unit 22 sequentially adds a predetermined value according to the size of a pixel to the minimum value in the lateral plot range to provide values on the abscissa. Coordinate position calculating unit 23 calculates a coordinate position on the diagram corresponding to the value on the abscissa provided by constant value adding unit 22 based on the functional expression which has already been input. Plot unit 24 plots points each corresponding to the coordinate position calculated by coordinate position calculating unit 23 on the display screen of display unit 25 to display the functional expression as a diagram eventually. These units include a CPU, an ROM, an RAM, a display portion, an input portion and the like, described above, and each operation is performed with a software.

The graphic plotting method with a software will now be described with reference to the flow chart shown in FIG. 8.

2

FIG. 9 shows the plotting manner on the display screen based on the flow chart of FIG. 8, with a plotted pixel shown as a black square.

At step S21, a functional expression, e.g. y=sin x, is input. At step S22, the minimum value 0 deg and the maximum value 180 deg are input as the calculation range and the display range of the variable x, and also the minimum value 0 and the maximum value 1 are input as the display range of the variable y. On the display screen of display unit 25 constituted of 64 pixels arranged in eight rows and eight columns, the lateral length of a pixel shown in FIG. 9 corresponds to the value 22.714 deg of the variable x set in the abscissa direction, and the longitudinal length thereof corresponds to the value 0.143 of the variable y set in the ordinate direction. FIG. 10 shows the correspondence of the pixel position to the coordinate position in the plot range.

At step S23, the value of the variable y corresponding to the minimum value 0 of the variable x is determined to be y=0, so that a coordinate position (0, 0) is obtained, in which the former numeral corresponds to an x-coordinate, while the latter corresponds to a y-coordinate. At step S24, corresponding to the coordinate position (0, 0), a pixel (0, 0), in which the former numeral corresponds to a position on the abscissa, while the latter corresponds to a position on the ordinate, is plotted on the left bottom corner on the screen of display unit 25, as shown in FIG. 9(a). At step S25, the calculation range 180 deg of the variable x is divided by seven, the number of boundaries in the eight pixels on the abscissa, so that the quotient 25.714 is provided. The quotient is then added as a constant value to the minimum value 0 of the variable x to give the value 25.714 of the variable x for subsequent calculation. At step S26, the value of the variable y corresponding to x=25.714 is determined by substitution for y=sin x to give a coordinate position (25.714, 0.4339). At step S27, a pixel (1, 3) is plotted corresponding to the coordinate position (25.714, 0.4339). When that pixel is not adjacent to the precedingly plotted pixel, a pixel for connecting those pixels is plotted according to a prescribed rule at step S28. In this case where pixels are not adjacent to each other, pixels (0, 1) and (1, 2) are plotted, as shown in FIG. 9(b). At step S29, whether the value of the variable x is equal to the maximum value is determined, and if so, plotting is terminated to complete the processing. Otherwise, the routine is returned to step S25, and repeats the above-described steps S25 through S29. In FIGS. 9, (c) to (h) show the plotting process on display unit 25 in repetition of steps S25 through S29. Through the above processing, a sine wave diagram expressed by y=sin x is plotted on display unit 25.

However, in the conventional structure described above where a value of the variable for subsequent calculation is determined by adding a constant value in the calculation range of the variable, a diagram must be plotted with a constant interval in order of the minimum value to the maximum value of the variable, so that the whole image of the diagram cannot be grasped until completion of the plotting.

As a solution for such a problem, an apparatus is proposed in Japanese Patent Laying-Open No. 4-112278, where plot spacing is made smaller with increase of the change ratio in a curve expressing a diagram. This apparatus can reduce time for plotting a diagram of small change ratio. Still the whole image of the diagram, however, is not grasped until completion of plotting, because a variable is plotted in order of the minimum value to the maximum value thereof in this apparatus, as in the conventional one.

SUMMARY OF THE INVENTION

An object of the present invention is to provide a graphic plotting apparatus capable of grasping the whole image of a diagram earlier before completion of plotting, and the graphic plotting method thereof.

A graphic plotting apparatus in accordance with the present invention includes an input unit for inputting a desired functional expression, a specifying unit for arbitrarily specifying the plot range and the plot spacing for a diagram to be represented by the input functional expression, a correlating unit for correlating the plot range and the plot spacing specified by the specifying unit to a position on a display, and a plotting unit for plotting the diagram with the spacing correlated by the correlating unit at the position on the display correlated by the correlating unit.

Accordingly, a diagram can be plotted with arbitrary spacing on the display unit, whereby the whole diagram can be plotted roughly at first, and then, sequentially plotted with closer spacing. Consequently, the whole image of the diagram can be grasped earlier before completion of the plotting.

In accordance with another aspect of the present invention, a graphic plotting method of the graphic plotting apparatus includes the steps of plotting on a display unit a diagram based on a functional expression with first spacing, and sequentially plotting on the display unit the diagram based on the functional expression with closer spacing than the first spacing.

Accordingly, the whole diagram can be plotted roughly at first, and sequentially plotted with closer spacing, whereby the whole image of the diagram can be grasped earlier before completion of the plotting.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

A graphic plotting apparatus in one embodiment of the present invention will hereinafter be described with the drawings.

Figure 2:
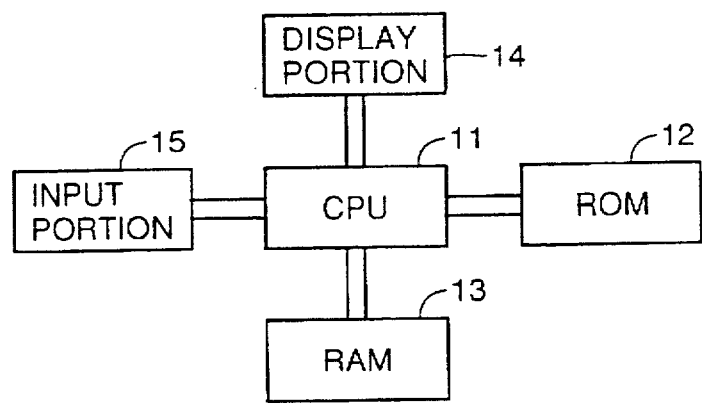
FIG. 2 is a block diagram showing the structure of the graphic plotting apparatus in one embodiment of the present invention.

FIG. 2 is a block diagram showing the structure of the graphic plotting apparatus in one embodiment of the present invention. The graphic plotting apparatus includes a CPU 11, an ROM 12, an RAM 13, a display portion 14, and an input portion 15. Various programs, such as a functional calculation program, a plot range setting program and a plotting program, are previously written in ROM 12. RAM 13 stores various numerical values and flags for calculation and plotting of a diagram. Specifically, RAM 13 includes a register for storing a functional expression to be plotted as a diagram, and a position on the y-axis (ordinate) corresponding to each position on the x-axis (abscissa) calculated by the functional expression, and a memory for storing the minimum value xmin and the maximum value xmax of the x-coordinate, the minimum value ymin and the maximum value ymax of a y-coordinate, and data for calculation of an x-coordinate and a y-coordinate for plotting a diagram. RAM 13 also stores flags indicating plotted points should be connected or not, for example. CPU 11 performs a functional calculation and the like based on data stored in ROM 12 and RAM 13, and data input from input portion 15, and the result is displayed as numerals, a diagram and the like on display portion 14.

Figure 3:
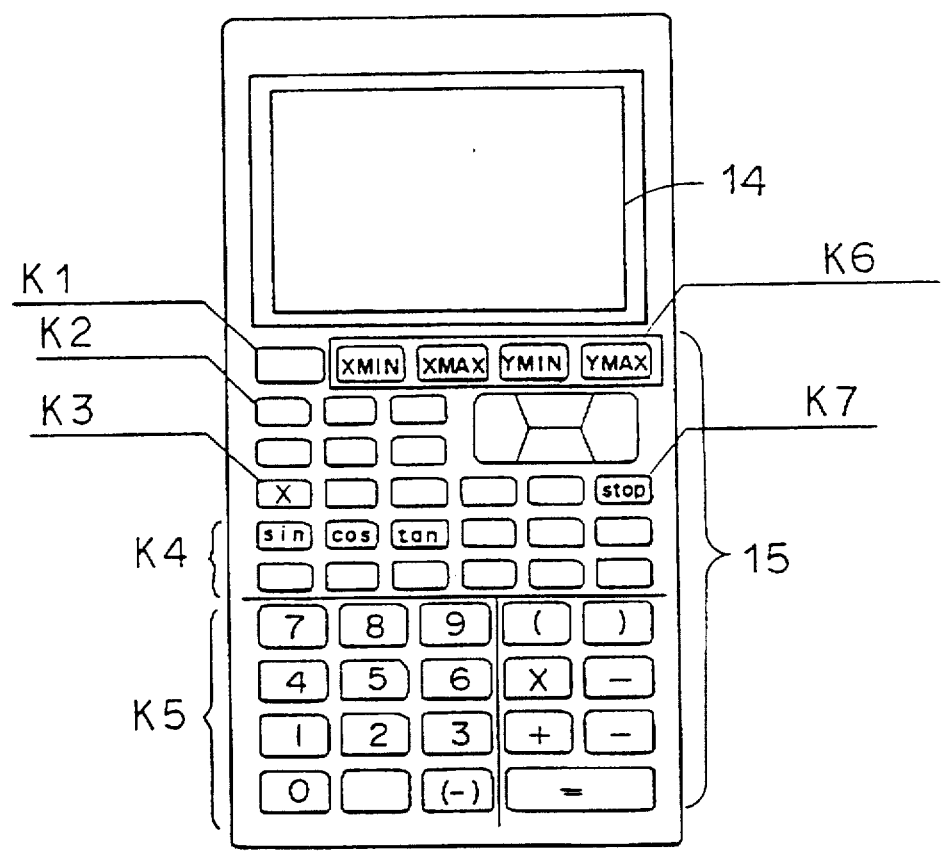
FIG. 3 is an outside view of the graphic plotting apparatus in one embodiment of the present invention.

FIG. 3 is an outside view of the graphic plotting apparatus in one embodiment of the present invention. On the lower part of the apparatus, a numeral key K5 and the like are provided for inputting numerals and performing four arithmetical operations. On the center part, a function key K4 and a variable input key K3 for inputting various functions, a coordinate range input key K6, a graph plotting key K1, a graph connect key K2 and a plotting stop key K7 for plotting a diagram are provided. On the upper part, a display portion 14, such as a liquid display element, is provided for displaying an expression and a program input therein, and a calculation result and a diagram. In the graphic plotting operation, selection is made by graph plotting key K1 as to whether a diagram should be plotted, and if so, the plot range for the diagram can be arbitrarily set by coordinate range input key K6. Additionally, plotting can be stopped by plotting stop key K7, or selection can be made by graph connect key K2 as to whether plotted points should be connected or not.

Figure 1:
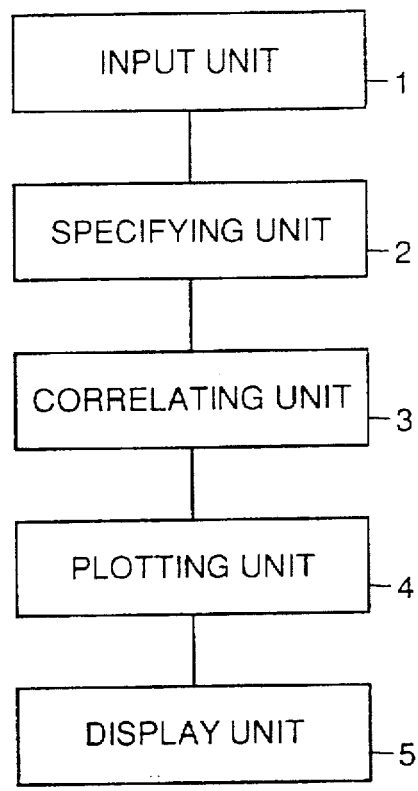
FIG. 1 is a block diagram showing the functional structure of a graphic plotting apparatus in one embodiment of the present invention.

As shown in FIG. 1, the graphic plotting apparatus of the present invention employing the above hardware functionally includes an input unit 1, a specifying unit 2, a correlating unit 3, a plotting unit 4, and a display unit 5. The plot range and the plot spacing of a diagram represented by a desired function input from input unit 1 including an input portion 15 and the like is specified by specifying unit 2 including CPU 11, ROM 12, RAM 13 and the like. The plot range and the plot spacing can be arbitrarily set by a program stored in ROM 12 and data input from input portion 15. Correlating unit 3 correlates the plot range and the plot spacing of the diagram specified by specifying unit 2 with a position on display unit 5, according to data concerning the number and size of pixels on a display screen of display unit 5 including a display portion 14, stored in ROM 12 and the like. Plotting unit 4 plots the diagram with the spacing correlated by correlating unit 3 at the position on display unit 5 correlated by correlating unit 3. As a result, the diagram can be plotted with arbitrary spacing on display unit 5.

The graphic plotting method employing the graphic plotting apparatus in accordance with the present invention will now be described with the drawings.

Figure 4:
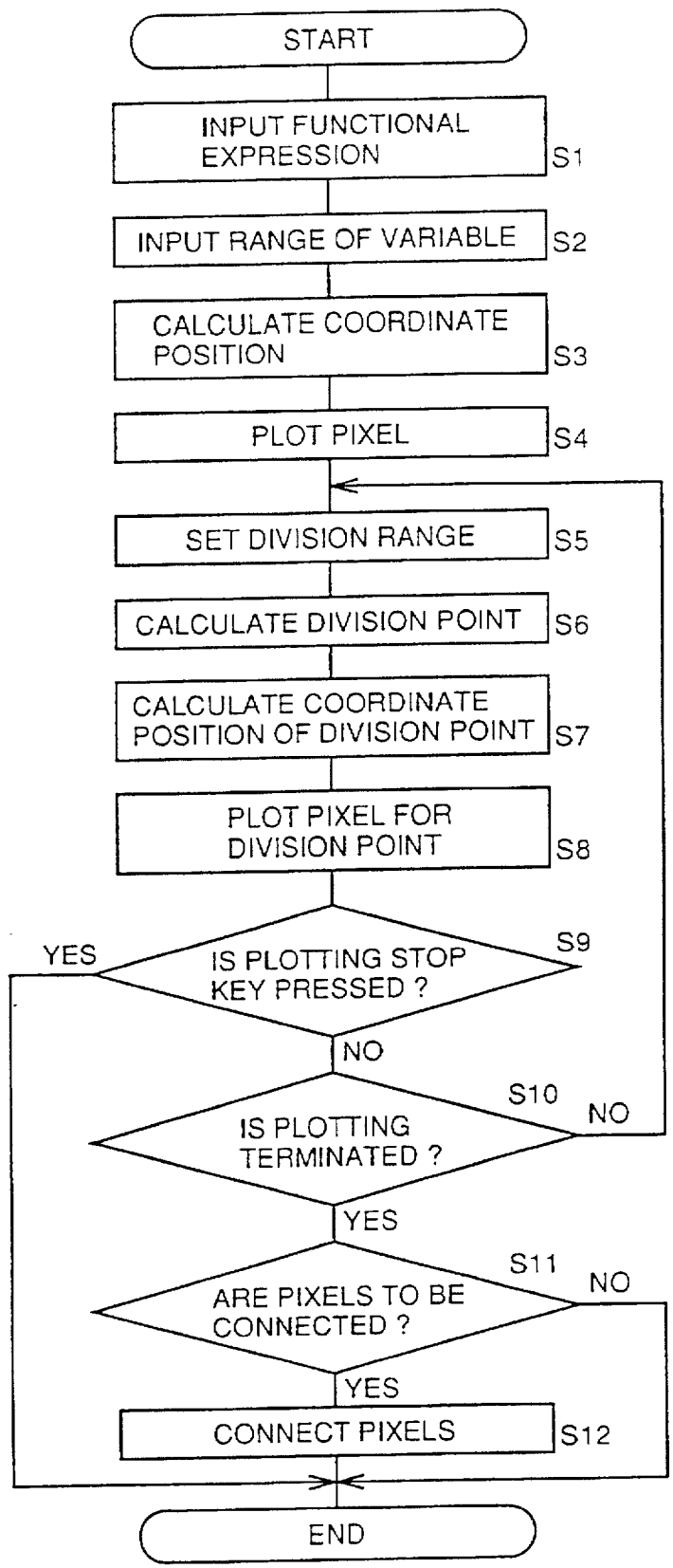
FIG. 4 is a flow chart showing a graphic plotting method of the graphic plotting apparatus in one embodiment of the present invention.

FIG. 4 is a flow chart of the graphic plotting method.

At step S1, a functional expression, e.g. y=sin x, is input. At step S2, in order for plotting a diagram by varying a variable x, the minimum value 0 deg and the maximum value 180 deg are input as the calculation range of the variable x. The minimum value 0 and the maximum value 1 of a variable y are also input as the display range of the ordinate. In this case, the variable x is applied as the abscissa, so that the display range of the abscissa is equal to the calculation range. These input operations are carried out with various keys of input portion 15.

At step S3, the minimum value 0 deg and the maximum value 180 deg of the variable x are substituted for the functional expression y=sin x, and both of the results are y=0 so that the coordinate positions corresponding to the variable x (0, 0) and (180, 0) are obtained. At step S4, a pixel corresponding to the coordinate position (0, 0) on display portion 14 is first plotted. Specifically, on the screen of display portion 14 similar to that employed in the conventional apparatus, the pixel (0, 0) is plotted, as shown in FIG. 5(a). Subsequently, the pixel (7, 0) corresponding to the coordinate position (180, 0) is plotted, as shown in FIG. 5(b). Through these operations, a diagram is plotted only with respect to the minimum value and the maximum value of the calculation range, which corresponds to the most roughly plotted condition of the diagram.

Figure 5:
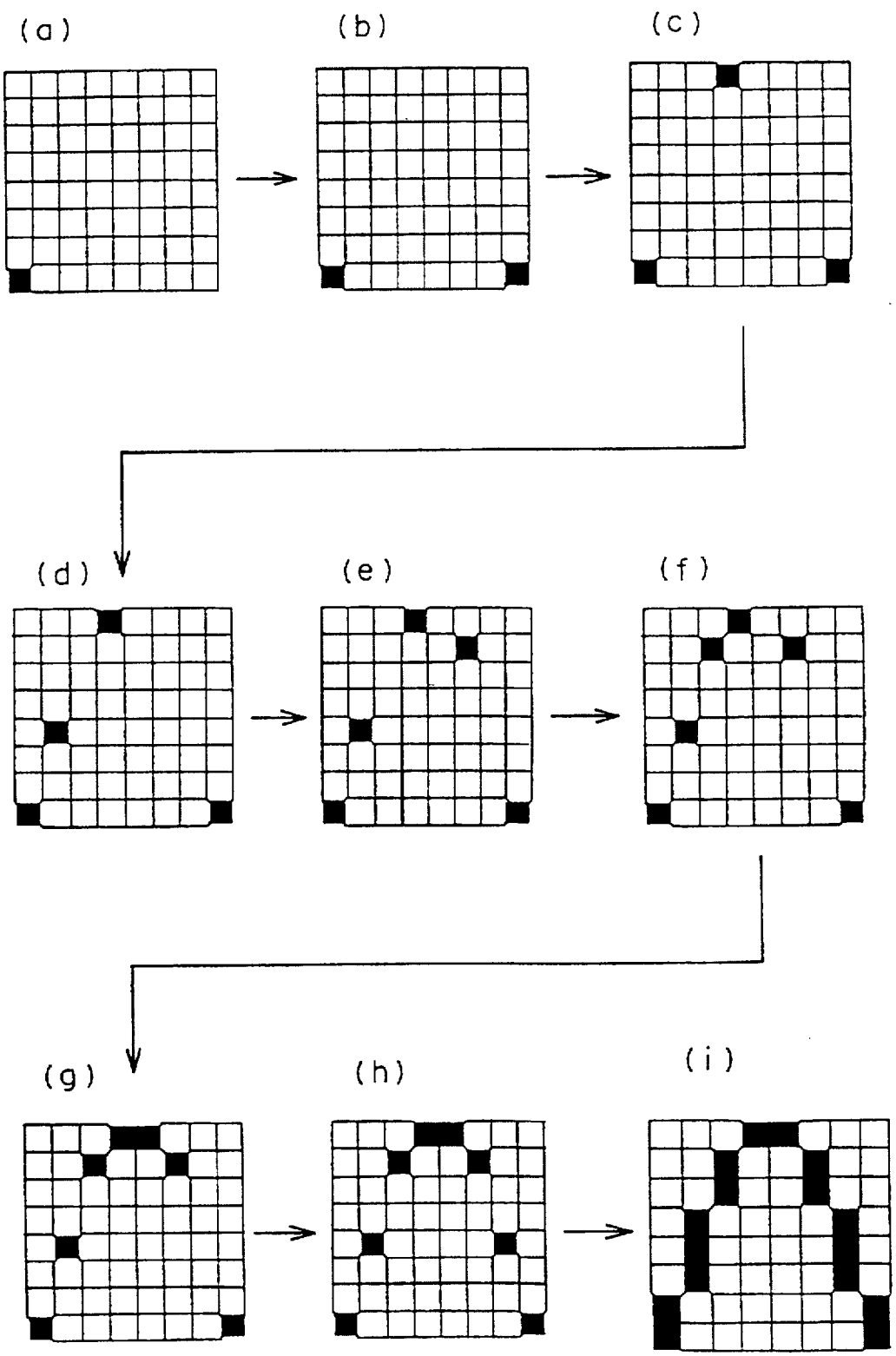
FIG. 5 is a schematic diagram showing the plotting process in the graphic plotting method of the graphic plotting apparatus in one embodiment of the present invention.
Figure 6:
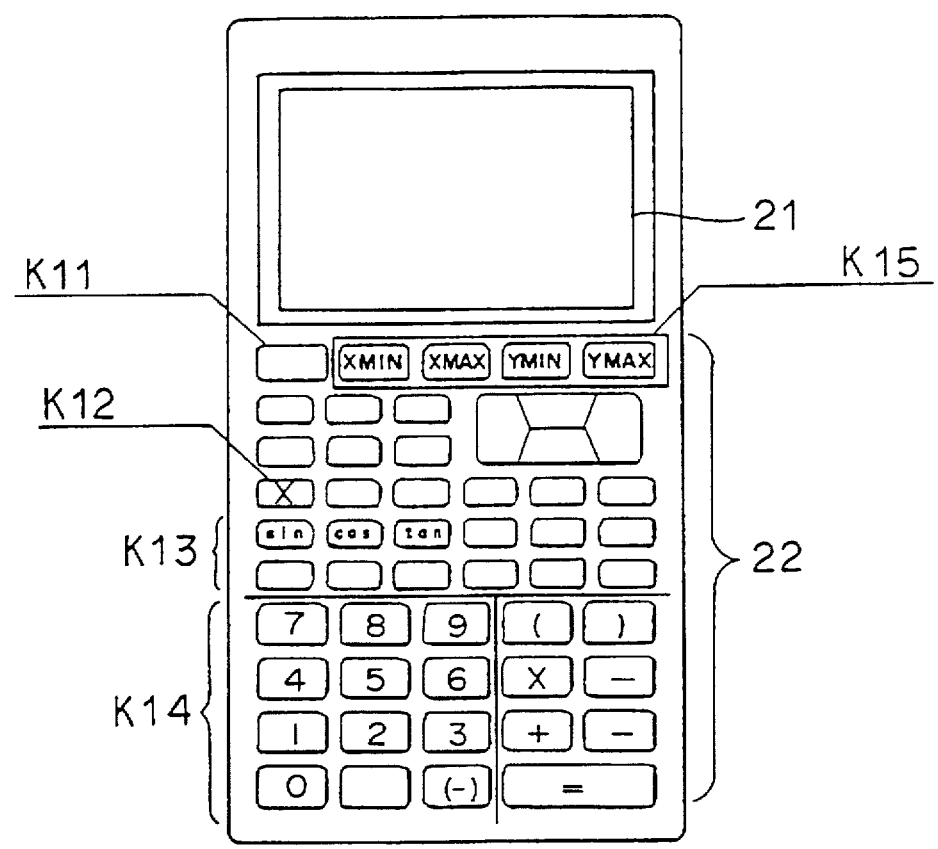
FIG. 6 is an outside view of a conventional graphic plotting apparatus.
Figure 7:
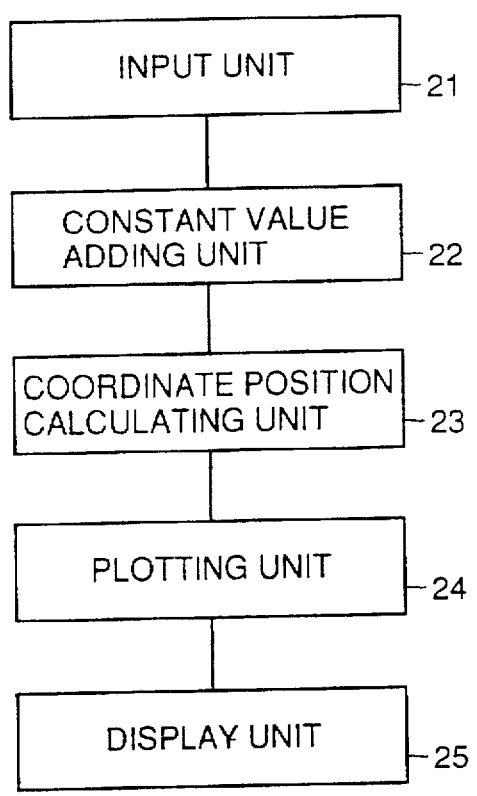
FIG. 7 is a block diagram showing the functional structure of the conventional graphic plotting apparatus.
Figure 8:
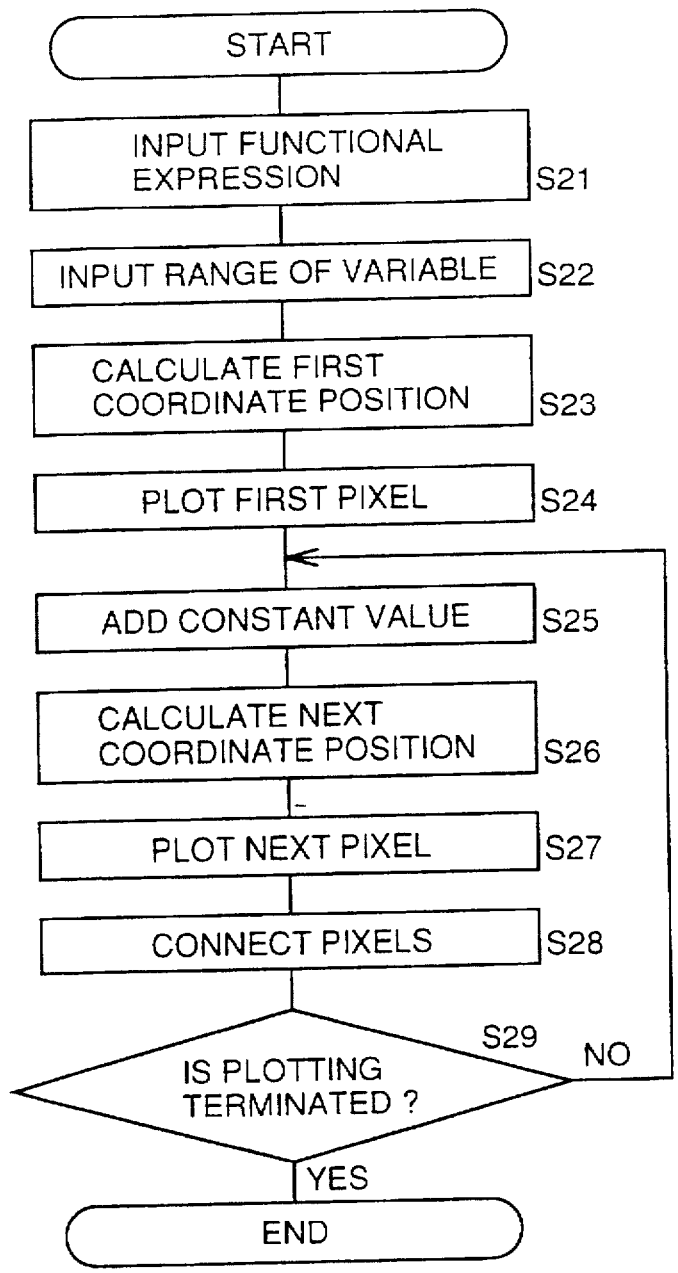
FIG. 8 is a flow chart showing a graphic plotting method of the conventional graphic plotting apparatus.
Figure 9:
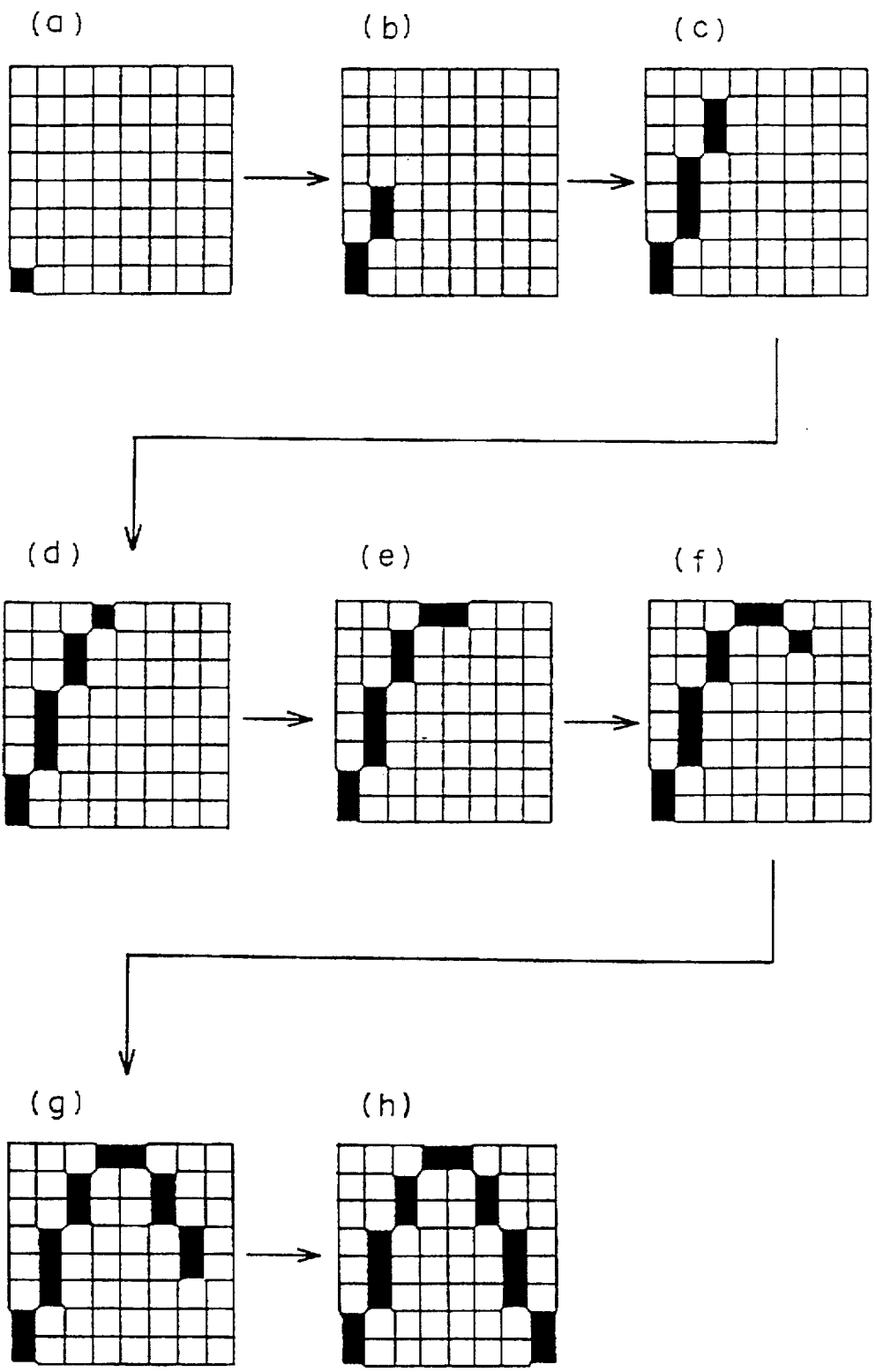
FIG. 9 is a schematic diagram showing a plotting process in the graphic plotting method of the conventional graphic plotting apparatus.
Figure 10:
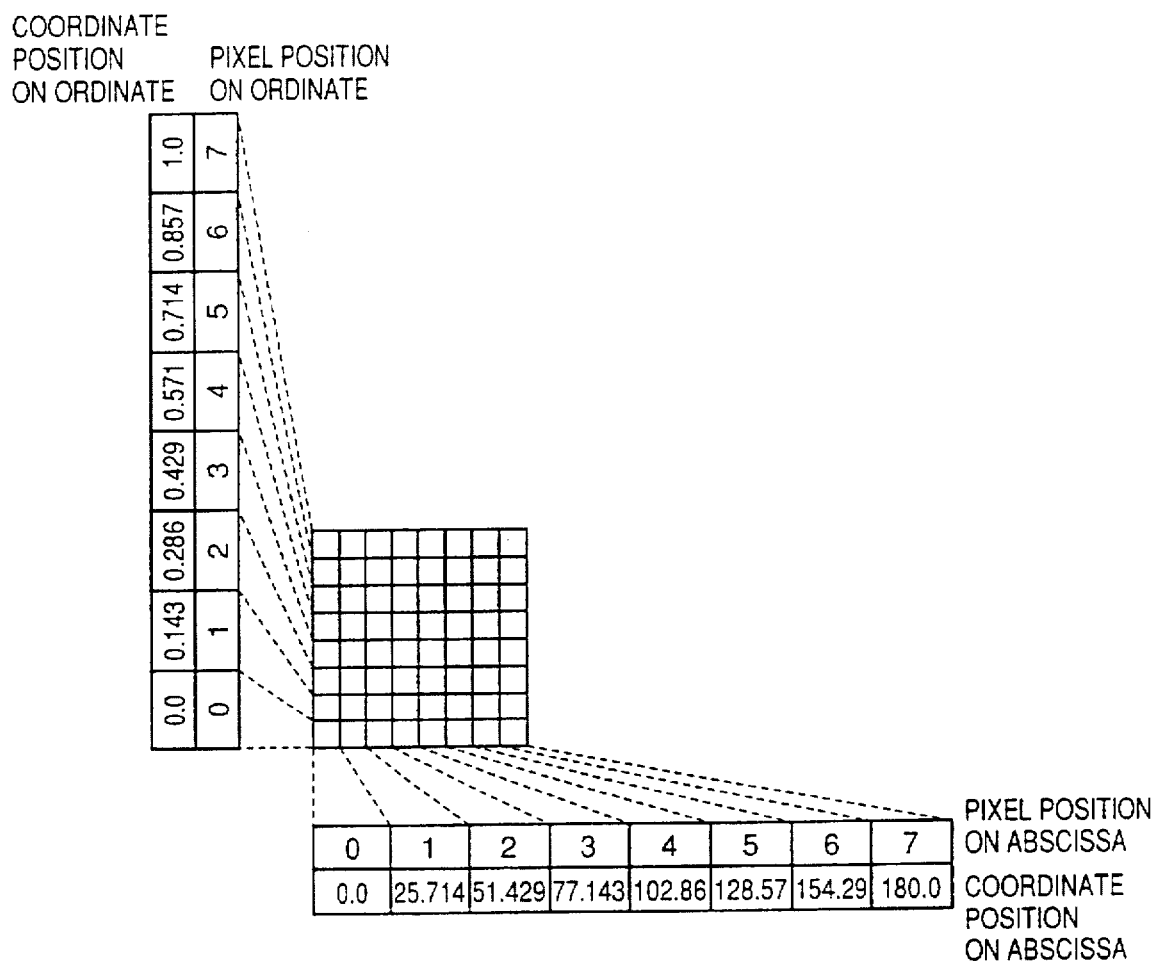
FIG. 10 is a schematic diagram showing the correspondence of a position of each pixel on a display screen of a display unit to a coordinate position in a plot range.

At step S5, the whole calculation range is set as a division range. At step S6, a division point is calculated. Description will hereinafter be made on the case where the division range is divided into two. Since the division range is equal to the calculation range, the value of the division point is x=90 deg. Since no pixel corresponds to 90 deg, a pixel in the third column is employed so that the value of the division point x=77.143 deg is obtained. At step S7, the value of the division point is substituted for the functional expression y=sin x to give y=0.9749, so that the coordinate position (77.143, 0.9749) corresponding to the division point is obtained. At step S8, a pixel (3, 7) corresponding to the coordinate position (77.143, 0.9749) is plotted on display portion 14, as shown in FIG. 5(c). At step S9, verification is made as to whether plotting stop key K7 has been pressed, and if so, plotting is stopped and the processing is terminated. Otherwise, the routine proceeds to step S10, and continues processing. At step S10, verification is made as to whether plotting for all pixels in the lateral direction is terminated, and if not, the routine returns to step S5 to repeat processing in steps S5 through S10. (d) to (h) of FIG. 5 show the plotting process in repetition of the above processing. In FIG. 5(d), a pixel (1, 3) corresponding to a coordinate position (25.714, 0.4339) is plotted; in FIG. 5(e), a pixel (5, 6) corresponding to a coordinate position (128.57, 0.7818) is plotted; in FIG. 5(f), a pixel (2, 6) corresponding to a coordinate position (51.429, 0.7818) is plotted; in FIG. 5(g), a pixel (4, 7) corresponding to a coordinate position (102.86, 0.9745) is plotted; and in FIG. 5(h), a pixel (6, 3) corresponding to a coordinate position (154.29, 0.4338) is plotted. In the above plotting, when a plurality of ranges divided by division points exist, they are then divided in the sequence of a closer range to the minimum value, and finally a range including the maximum value is divided. When no pixel directly corresponds to a coordinate position of a division point, a closer pixel to the calculated coordinate position is selected for plotting. Through this processing, plotting of eight pixels corresponding to the abscissa is completed, and the routine proceeds from step S10 to step S11, where verification is made as to whether to connect the pixels or not. If graph connect key K2 has already been pressed, the routine proceeds to step S12, where plotting is performed so as to connect the pixels, as shown in FIG. 5(i). Plotting of the diagram is thus completed.

With the above graphic plotting method, therefore, the whole diagram can be plotted roughly at first, and plotted sequentially with closer spacing, whereby the whole image of the diagram can be grasped from the condition of FIG. 5(c).

While the case has been described where the calculation range is equal to the abscissa range in the present embodiment, even when the calculation range is different from the plot range in the abscissa direction, as in calculation with a parameter, the same effects can be obtained by setting the minimum value and the maximum value of the parameter as the calculation range, and the plot range on the ordinate and the abscissa at step S2, and carrying out similar processing based on the parameter. Also, while a division point is determined by dividing the calculation range into two in the present embodiment, the number of division and spacing for the division may be arbitrarily changed so long as plotting should be performed roughly.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A hand-held graphic apparatus comprising:
    input means for inputting a functional expression to be displayed as a diagram and for inputting a point range and a point spacing of the diagram;
    control means, coupled to said input means, for determining positions of points on the diagram in accordance with the input functional expression, the input point range and the input point spacing; and
    display means, coupled to said control means, for displaying the diagram in accordance with the determined positions of the points,
    said control means providing the determined points to said display means such that points of the diagram corresponding to ends of the input point range are provided first and remaining points are thereafter provided so that a minimum shape necessary to discern a shape of the diagram is displayed first.

2. The hand-held graphic apparatus of claim 1, wherein said control means provides the determined points to said display means such that after the points of the diagram corresponding to the ends of the input point range are displayed, a midpoint of an arbitrary range within the input point range is displayed and the remaining points are thereafter displayed.

3. The hand-held graphic apparatus of claim 1, wherein said input means comprises stop means for inputting a stop command, said control means stopping further provision of the determined points upon receipt of the stop command such that no further remaining points are displayed.

4. The hand-held graphic apparatus of claim 1, wherein said control means provides the determined points to said display means such that the points of the diagram are connected.

5. A method of graphic plotting for a hand-held graphic apparatus comprising the steps of:
    a) providing a functional expression to be displayed as a diagram and providing a point range and a point spacing of the diagram;
    b) determining positions of points on the diagram in accordance with the provided functional expression, point range and point spacing; and c) displaying the diagram in accordance with the determined positions of the points, the positions of the points being determined in said step b) such that points of the diagram corresponding to ends of the input point range are displayed first in said step c) and remaining points are thereafter displayed so that a minimum shape necessary to discern a shape of the diagram is displayed first.

6. The method of graphic plotting of claim 5, wherein the positions of the points are determined in said step (b) such that after points of the diagram corresponding to the ends of the input point range are displayed in said step c), a midpoint of an arbitrary range within the point range is displayed and the remaining points are thereafter displayed.

7. The method of graphic plotting of claim 5, further comprising the step of stopping further display of the determined points in said step c) upon receipt of a stop command such that no further remaining points are displayed.

8. The method of graphic plotting of claim 5, wherein the position of the points are determined in said step b) such that the points of the diagram are connected.

* * * * *